United States Patent [19]

Szlaga

[11] Patent Number: 4,760,858
[45] Date of Patent: Aug. 2, 1988

[54] FUEL VAPOR CONTROL VALVE

[75] Inventor: Emil Szlaga, Connersville, Ind.

[73] Assignee: Stant Inc., Connersville, Ind.

[21] Appl. No.: 911,243

[22] Filed: Sep. 24, 1986

Related U.S. Application Data

[63] Continuation-in-part of Ser. No. 837,152, Mar. 7, 1986, Pat. No. 4,655,238.

[51] Int. Cl.⁴ .............................................. F16K 17/36
[52] U.S. Cl. ...................................... 137/43; 137/587; 220/85 VS; 220/85 VR; 220/86 R
[58] Field of Search ........................... 137/39, 43, 587; 220/85 F, 85 VR, 85 VS, 86 R, 373, DIG. 27

[56] References Cited

U.S. PATENT DOCUMENTS

| | | |
|---|---|---|
| 1,322,493 | 11/1919 | Little . |
| 1,423,831 | 7/1922 | Cochcrane . |
| 1,579,543 | 4/1926 | King . |
| 1,679,929 | 8/1928 | Brandon . |
| 1,683,338 | 9/1928 | Evinrude . |
| 1,932,384 | 10/1933 | Alton . |
| 2,159,178 | 5/1939 | Rike . |
| 2,396,233 | 3/1946 | Abrams . |
| 2,615,460 | 10/1952 | Crow . |
| 3,521,652 | 7/1970 | Reeks . |
| 3,771,690 | 11/1973 | Hunter ............................. 137/43 X |
| 3,996,951 | 12/1976 | Parr et al. . |
| 4,007,643 | 2/1977 | Matsushita . |
| 4,095,609 | 6/1978 | Martin . |
| 4,162,021 | 7/1979 | Crute . |
| 4,166,605 | 9/1979 | Hall . |
| 4,250,360 | 2/1981 | Svensson . |
| 4,323,166 | 4/1982 | Maeroff ............................. 220/86 R |
| 4,351,350 | 9/1982 | Crute . |
| 4,416,108 | 11/1983 | Ghandi ............................. 220/85 VS |
| 4,655,238 | 4/1987 | Szlaga ............................. 137/43 |

Primary Examiner—Robert G. Nilson
Attorney, Agent, or Firm—Barnes & Thornburg

[57] ABSTRACT

A fuel vapor recovery system of a motor vehicle is disclosed including a valve. The valve is situated between a fuel tank and a conduit leading from the fuel tank to a canister. The valve includes a chamber having a first opening to the fuel tank and a second opening to the conduit. The valve also includes a ball for closing the first opening, the ball having a mass selected to effect a first closing pressure on the first opening when the vehicle is stationary. The size of the ball is selected relative to the chamber to permit movement within the chamber to effect a second closing pressure less than the first closing pressure when the vehicle is subjected to vibration. The first closing pressure is selected to produce a predetermined head pressure in the fuel tank during introduction of fuel into the fuel tank which effectively blocks the introduction of fuel in excess of a predetermined maximum fuel capacity, thereby preventing overfilling of the fuel tank. The ball vibrates within the chamber to open the first opening and release pressure in the fuel tank.

7 Claims, 3 Drawing Sheets

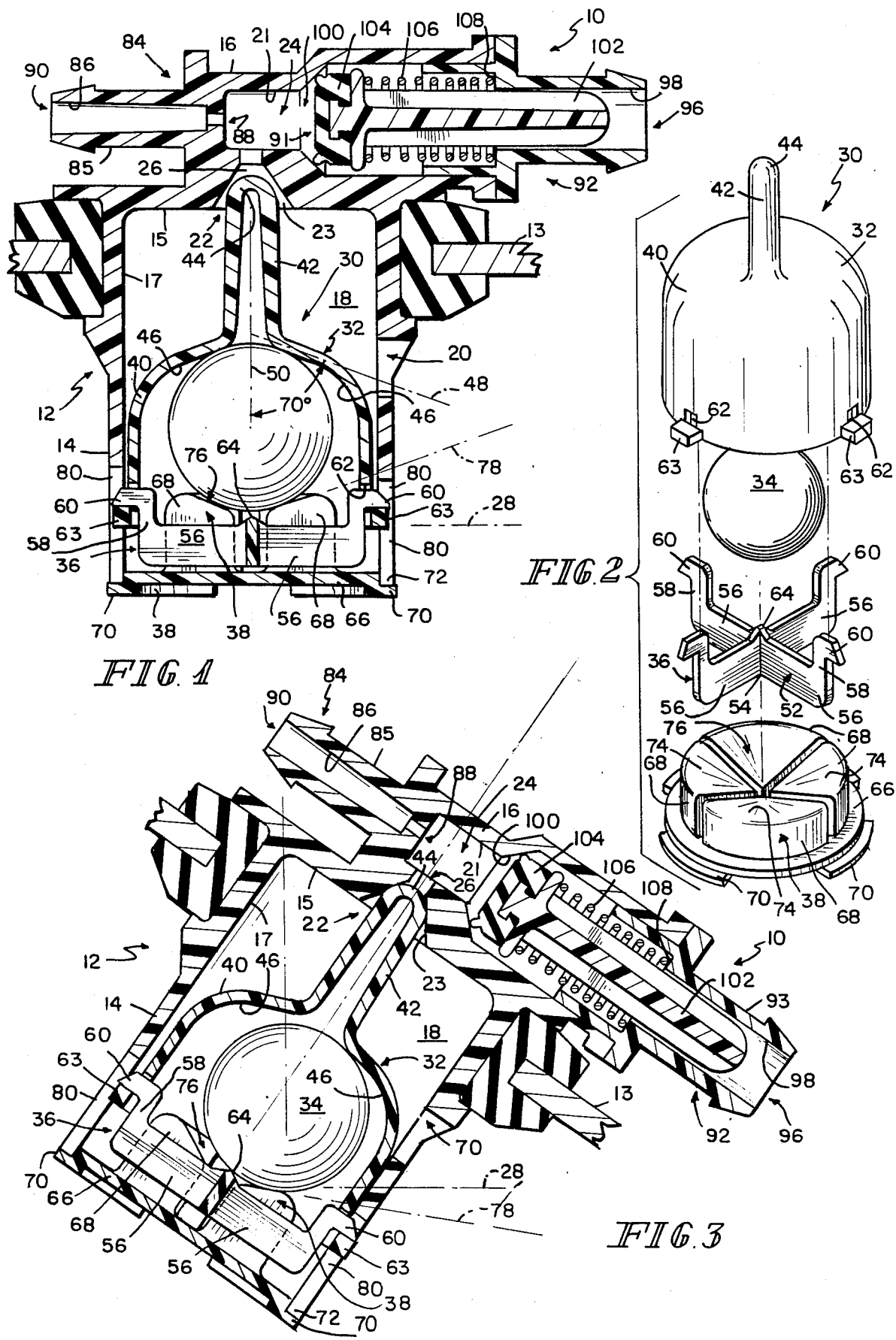

FUEL VAPOR CONTROL VALVE

BACKGROUND AND SUMMARY OF THE INVENTION

This is a continuation-in-part of co-pending application Ser. No. 06/837,152, filed March 7, 1986, now U.S. Pat. No. 4,655,238.

The present invention relates to fuel system valves, and particularly to a valve for regulating the flow of fuel vapor through a venting outlet provided in a fuel tank having a separate filler neck. More particularly, the present invention relates to a vehicle fuel vapor control valve which maintains a predetermined head pressure in the fuel tank during stationary refueling to prevent a person from overfilling the fuel tank and also releases fuel vapor at pressures below the predetermined head pressure in response to vibrations induced during vehicle transit.

Vehicle fuel systems are known to include pressure-relief valves mountable on either fuel tanks or filler necks. These conventional valves are not equipped to regulate the volume of fuel introduced into the vehicle fuel system during refueling. Although fuel pump nozzles are known to include sensor means for shutting off the flow of fuel from the nozzle when the fuel tank is nearly filled, it has been observed that users frequently manually override or bypass such fill-limiting sensors by continuing to pump fuel after the pump nozzle has automatically shut off several times. It will be appreciated that such unauthorized refueling practices can result in overfilling the fuel tank which can effectively reduce the fuel vapor expansion capacitY available within the filled fuel tank.

An improved fuel vapor control valve is provided for maintaining a head pressure within the fuel tank which exceeds the maximum head pressure that can develop in the filler neck due to filling the filler neck with fuel. The improved valve advantageously aids in preventing fuel pump operators from overfilling fuel tanks by providing a pressurized fuel vapor barrier within the fuel tank that acts to block the introduction of fuel into the fuel tank in excess of a predetermined fuel capacity during refueling. At the same time, the improved valve is adapted to vibrate and release fuel vapor during vehicle transit to increase the flow of fuel vapor to a fuel vapor treatment site and/or the atmosphere, thereby enhancing engine performance, and avoiding shortcomings of known fuel tank valves.

According to the present invention, a vehicle fuel vapor control valve is provided for use with a vehicle fuel system. The fuel system desirably includes a fuel tank having a filler neck and a separate venting outlet. The fuel vapor control valve includes control means in the venting outlet for maintaining a predetermined pressure head in the fuel tank in excess of a maximum pressure head in a filler neck resulting from filling the filler neck with fuel during refueling. The predetermined pressure head acts to block the introduction of fuel in excess of a selected volume into the fuel tank, thereby aiding in preventing overfilling of the fuel tank during refilling. The fuel vapor control valve also includes release means for substantially disabling the control means in response to vibrating movement of the control means during vehicle transit. The release means permits fuel vapor having a pressure less than the predetermined threshold pressure to be vented through the venting outlet from the fuel tank to a remote fuel vapor treatment site or the atmosphere.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a sectional detail view of one embodiment of a valve in accordance with the present invention showing the valve in a normal, upright position;

FIG. 2 is an exploded assembly view of one portion of the valve shown in FIG. 1;

FIG. 3 is a view of the valve illustrated in FIG. 1 showing the valve in a tilted position;

DETAILED DESCRIPTION OF THE DRAWINGS

Figure 5:
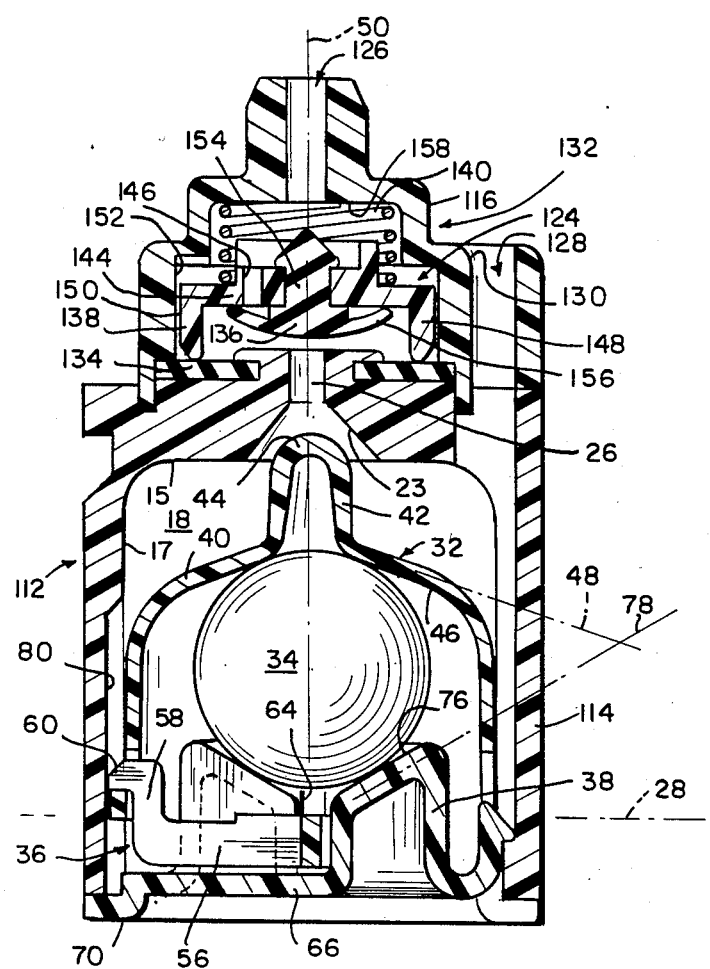
FIG. 5 is a sectional detail view of yet another embodiment of the present invention.

A first embodiment of the invention is illustrated in FIGS. 1-3. A valve assembly 10 is provided for use with a conventional fuel system (not shown) having a fuel tank and a fuel vapor storage canister. Referring particularly to FIGS. 1 and 3, the valve assembly 10 includes a hollow valve housing 12 mounted to a wall 13 of a fuel tank or the like and having a lower roll-over safety portion 14 and an upper pressure-relief portion 16.

The lower roll-over safety portion 14 includes a top wall 15 and a generally cylindrical side wall 17 which cooperate to define a valve chamber 18 having an inlet 20 formed in the side wall 17 and an outlet 22 formed in the top wall 15. The inlet 20 is in fluid/vapor communication with a fuel tank or the like. The lower portion 14 is formed to include an axially downwardly-facing, generally conical valve seat 23 in concentric registry with outlet 22.

The upper pressure-relief portion 16 is formed to include an interior wall 21 defining a vapor discharge chamber 24, and a passageway 26 interconnecting the vapor discharge chamber 24 and the outlet 22 of the valve chamber 18 in fluid/vapor communication. During vehicle operation, fuel vapors accumulated in the fuel tank are introduced into the valve chamber 18 under pressure. These fuel vapors are selectively transmitted via fluid-conducting passageway 26 to the vapor discharge chamber 24 for subsequent distribution to the canister (not shown) and to the atmosphere.

A roll-over assembly 30 is installed in the lower portion 14 to control fluid flow through the fluid-conducting passageway 26. The roll-over assembly 30 automatically closes the valve chamber outlet 22 during vehicle rollover and change in vehicle motion to prevent the flow of liquid fuel and/or fuel vapors through passageway 26 and into both of the canister and the atmosphere, thereby lessening the danger of explosion or other hazard.

As soon as a rolled-over vehicle is substantially returned to an upright position, the roll-over assembly 30 functions to open the valve chamber outlet 22 to permit resumption of unimpeded flow of fuel vapors through passageway 26. As shown best in FIG. 2, the roll-over assembly 30 includes a valve member 32, a stainless steel ball 34, a ball retainer 36, and a valve member retainer 38. The roll-over assembly 30 can be preassembled in a manner described below and installed in the valve chamber 18.

The valve member 32 includes a downwardly opening ball-receiving cup 40 and an integral upstanding valve stem 42. The valve stem 42 has a distal, spherical end 44 for engaging valve seat 23 to close the chamber outlet 22. An interior wall of the cup 40 is configured to define a novel first inclined ramp portion 46. As shown best in FIG. 1, the first inclined ramp portion 46 is substantially defined by a downwardly-extending generatrix 48 to present a downwardly-opening, outwardly-extending, contoured, flared camming surface. Illustratively, the first inclined ramp portion 46 is positioned in relation to the longitudinal axis 50 of the valve housing 12 to define an included angle of about 70°. In other words, the novel first ramp portion 46 is inclined at an angle of about 20° relative to horizontal reference plane 28.

The ball retainer 36 includes a crisscross frame 52 for retaining the ball 34 in the inverted cup 40. The crisscross frame 52 includes a center portion 54 and four mutually perpendicular arms 56 extending away from center portion 54. Each arm 56 includes a distal end 58 and an outwardly turned L-shaped mounting tab 60 extending upwardly therefrom for snapping into engagement with four circumferentially spaced-apart mounting holes 62 formed in the lowermost portion of the inverted cup 40. A tab-supporting flange 63 is provided on the exterior of the cup 40 underneath each mounting hole 62 to support a mounting tab 60 extending therethrough. A raised contact surface 64 extends upwardly from the center portion 54 of the crisscross frame 52 to a point below the upwardmost extension of the mounting tabs 60.

The valve member retainer 38 illustratively includes a base member 66 and four integral upstanding wedge members 68 for retaining the valve member and ball retainer assembly 32, 36 in the valve housing 12. The base member 66 includes mounting flanges 70 for snapping into engagement with circumferentially spaced-apart channels 72 formed in the lowermost portion of valve housing 12 as shown best in FIGS. 1 and 3.

The distal ends 74 of upstanding wedge members 68 cooperate to define a second inclined ramp portion 76. As shown best in FIG. 1, the second inclined ramp portion 76 is substantially defined by an upwardly-extending generatrix 78 to present an upwardly-opening, outwardly-extending, contoured, flared camming surface. Illustratively, the second inclined ramp portion 76 is positioned in relation to the longitudinal axis 50 of the valve housing to define an included angle of about 70°. In other words, the second ramp portion 76 is inclined at an angle of about 20° relative to horizontal reference plane 28. Advantageously, the first and second inclined ramp portions 46, 76 cooperate to convert radially-outward movement of a ball disposed therebetween in camming relation into axially-upward movement of the valve stem 42 toward the chamber outlet 22 during tilting of the valve housing 12.

The roll-over assembly 30 illustrated in FIG. 2 is assembled and installed in the valve chamber 18 in the manner described below. When assembled, the valve member 32 is movable within the valve chamber 18 between a chamber outlet-opening position shown in FIG. 1 and a chamber outlet-closing position shown in FIG. 3.

The ball retainer 36 is coupled to the valve member 32 to retain a ball 34 disposed within the interior of the inverted cup 40 by inserting the mounting tabs 60 of the crisscross frame 52 into the respective mounting holes 62 formed in the cup 40 in abutting relation to the tab-supporting flanges 63. The valve member 32 and the ball retainer 36 are configured to permit movement of the trapped ball 34 in a radially-outward direction during tilting of the valve housing while substantially limiting movement in axially outward and inward directions. The valve member retainer 38 is then interengaged with the ball retainer 36 by inserting the four distal ends 74 of the upstanding wedge member 68 into the four spaces intermediate mutually-perpendicular frame arms 56. This "loose" assembly is then mounted in the valve housing 12 by: (1) inserting the valve stem 42 into the lower opening in the valve housing 12 so that the valve stem 42 extends through the chamber outlet 22 and is in close proximity to valve seat 23; (2) inserting mounting tabs 60 and companion tab-supporting flanges 63 into a like plurality of axially elongated circumferentially spaced-apart guide slots 80 formed in the valve housing 12 as shown in FIGS. 1 and 3; and then (3) interengaging the mounting flanges 70 of the base member 66 and the channels 72 formed in the valve housing 12.

When assembled, the valve member retainer 38 is fixed in relation to the valve housing 12 while the valve member and ball retainer assembly is guided by guide slots 80 for movement along the longitudinal axis 50 of the valve housing between chamber outlet-closing and -opening positions. In addition, when the valve member 32 is in its chamber outlet-opening position, the second inclined ramp portion 76 is situated to overlie the contact surface 64 so that the downwardly-presented surface of the ball 34 is seated on the second inclined ramp portion 76 without contacting the contact surface 64 of the ball retainer 36. As will be explained, the contact surface 64 provides means for transmitting the gravitational force of the ball 34 to the valve member 32 via the ball retainer 36 to aid in moving the valve member 32 from its outlet-closing position toward its outlet-opening position.

A constant orifice valve 84 is provided in the upper pressure-relief portion 16 of the valve housing 12 for discharging a substantially constant volumetric flow rate of fuel vapor from the hollow valve housing 12 to a canister (not shown). The constant orifice valve 84 includes an overflow tube 85 having a fluid-conducting passageway 86. The passageway 86 includes an inlet orifice 88 of uniform cross-section in fluid communication with the vapor discharge chamber 24 and an outlet 90 that is connectable to a conventional canister. Fuel vapors discharged from the fuel tank into the vapor discharge chamber 24 are distributable to the canister via constant orifice valve 84.

A variable flow valve 92 is also provided in the upper pressure-relief portion 16 of the valve housing 12 for selectively discharging a controlled volume of fuel vapor from the hollow valve housing 12 to the atmosphere. The variable flow valve 92 includes a purge tube 93 having an inlet orifice 94 in fluid communication with the vapor discharge chamber 24, an outlet orifice 96 that empties into the atmosphere, and a fluid-conducting passageway 98 extending therebetween. The innermost portion of passageway 98 is formed to include a generally conical valve seat 100 in concentric registry with the inlet orifice 94. The valve seat 100 defines a diverging nozzle extending in a direction toward the outlet orifice 96.

In order to vary selectively the flow of fuel vapor to the atmosphere through passageway 98, an elongated valve stem 102 having a valve seal 104 at its innermost end is positioned in passageway 98. The valve seal 104 is yieldably urged into closing engagement with the valve seat 100 by means of a coiled compression spring 106 which seats on an abutment ring 108 formed to extend into the passageway 98 intermediate the inlet 94 and outlet 96.

In operation, ball 34 rides on both of the opposing first and second inclined camming surfaces 46, 76 to move the valve stem 42 upwardly into closing engagement with the valve seat 23 surrounding the chamber outlet 22 in response to tilting movement of the valve housing 12 during vehicle rollover and abrupt changes in vehicle motion. Illustratively, included angles of about 70° are formed between the longitudinal axis 50 and each of the ramp-defining, upwardly-extending and downwardly-extending generatrices, 78 and 48, respectively. These particular angles were selected so that the novel pair of opposing companion inclined surfaces would cooperate to convert radially outward movement of ball 34 into axially upward movement of valve member and ball retainer assembly 32, 36 so as to cause the valve stem 42 to move into closing engagement with valve seat 23 when the longitudinal axis 50 is tilted at least at an angle of about 35° (See FIG. 3) from its normal upright vertical position (See FIG. 1).

One object of the present invention is to provide a fuel tank valve having a roll-over safety valve, an integral flow orifice to control fuel vapor flow to the canister, and also an on/off vapor release valving mechanism for purging fuel tank vapors to the atmosphere. Advantageously, the vapor release valve provides means for venting selected amounts of fuel tank vapor to the atmosphere to improve hot engine performance by minimizing fuel tank pressure and reducing fuel vapor mass flow to the canister. The vapor release valve of the present invention permits excess pressure to be relieved to the atmosphere. This protects the purge air from becoming excessively saturated, and consequently, enhances vehicle driveability. The novel "double ramp" design of the roll-over assembly 30 effectively overcomes problems that were encountered during the development of a fuel tank valve having a canister discharge valve (e.g., 84) and an atmosphere discharge valve (e.g., 92).

During development of the fuel tank valve of the present invention, it became necessary to enlarge the chamber outlet orifice 22 to accommodate the increased fuel vapor flow rate created by the addition of atmospheric purge valve means 92, and also meet minimum performance criteria. One problem caused by enlargement of the chamber outlet orifice 22 was an increase in the differential pressure at the chamber outlet 22. This increased differential pressure increased an upwardly-directed applied force on the valve stem 42 in each of a roll-over and excessive vibration condition. This applied force acted to retain unnecessarily the valve stem 42 in its seated vent passageway-closing position (See FIG. 3) long after the rolled over vehicle (and tilted fuel tank valve) had been returned to an upright position (See FIG. 1) following an accident. Such an unwanted applied force has also been observed in cases where a vehicle fuel tank valve having an enlarged chamber outlet 22 is subjected to excessive vibration.

The foregoing developmental "valve closure" problem was alleviated in the present invention by increasing the mass of the ball 34 to increase the downwardly directed gravitational force of the ball 34 and thereby counteract the pressure- or vibration-induced upwardly-directed applied force on the valve stem 42. This was accomplished by enlarging the diameter of the ball 34 itself a sufficient amount to nearly double the weight of the ball 34. However, one problem caused by enlargement of the ball 34 was an effective reduction in the ball-receiving space defined by inverted cup 40 and the ball retainer 36. packaging requirements prohibited increasing the volume of inverted cup 40 to compensate for enlargement of the ball 34. In effect, necessary enlargement of the ball diameter without increasing the cup diameter created a geometric condition that limited radially outward travel of trapped ball 34 and thereby reduced the axial travel of the valve member 32 in the valve chamber 18 during vehicle rollover. The effect of such a reduction in axial travel of the valve member 32 was that the ball 32 did not operate to lift the valve stem 42 into closing engagement with valve seat 23 when the longitudinal axis 50 of the valve housing 12 was tilted at an angle of about 20° relative to vertical during the vehicle roll-over accident.

The novel "double ramps" 46, 76 of the present invention provide a remedy to the foregoing developmental problems by increasing the vertical lift of the valve member 32 without necessitating enlargement of the volume of inverted cup 40 to provide space for increased radially outward movement of the valve member-driving ball 34 during vehicle rollover. Although each of the generatrices 48, 78 of camming ramps 46, 76 are inclined at an angle of about 20° in relation to horizontal reference plane 28, the positioning of camming ramps 46, 76 in opposing spaced-apart facing relation causes the camming ramps 46, 76 to cooperate to define an "effective ramp surface" of about 40° in relation to horizontal reference plane 28. This novel feature advantageously operates to increase valve member lift without actually increasing the slope of the generatrix 78 of the first inclined ramp portion 76 to a theoretically necessary above-noted angle of about 40°.

In summary, the function of the valve member and ball retainer assembly 32, 36 is twofold. First, the novel configuration of inverted cup 40 defining first inclined ramp portion 46 operates to position the valve stem 42 in closing engagement with the valve seat 23 when the valve housing is tilted at an angle of about 20° in relation to the vertical during vehicle rollover. Second, the contact surface 64 of the ball retainer 36 engages the downwardly-facing surface of ball 34 as the valve member 32 travels from its outlet-closing to its outlet-opening position to provide sufficient downward force on the valve stem 42 to prevent the valve stem 42 from being held against the valve seat 23 surrounding the chamber outlet 22 during a vapor flow condition caused by vehicle rollover, excessive valve housing vibration, or the like.

Figure 4:
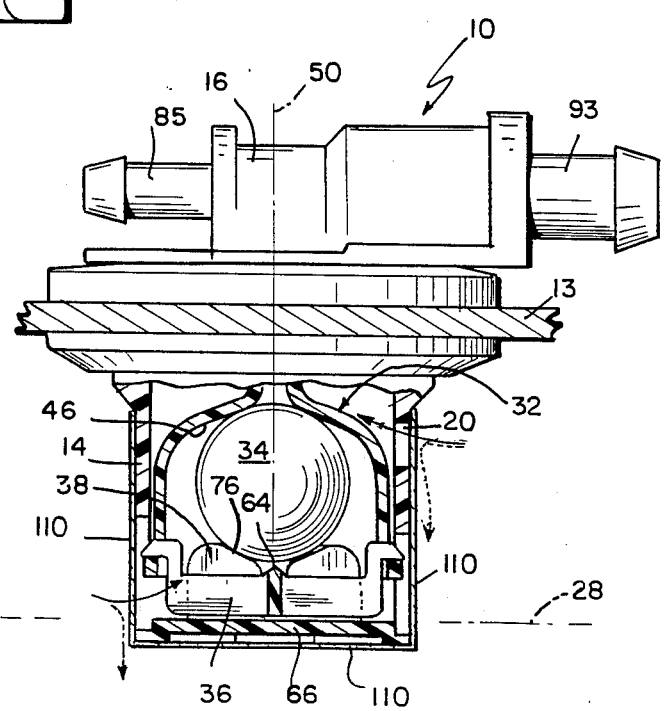
FIG. 4 is a sectional detail view of another embodiment of the present invention.

In another embodiment of the invention illustrated in FIG. 4, those elements referenced by numbers identical to those in FIGS. 1–3 perform the same or similar function. A discriminator filter 110 is positioned to cover the vapor flow inlet openings (e.g. 20) in the lower portion 14 of valve housing 12. One object of filter 110 is to retard liquid fuel flow into and through the valve assembly 10 during times of excessive fuel sloshing in the fuel tank, thereby advantageously minimizing unnecessary discharge of fuel through the valve assembly 10.

Preferably, the filter 110 is formed of a porous plastics material or the like which retards liquid fuel flow (represented by broken lines in FIG. 4) into the valve chamber 18 without substantially impairing the flow of fuel vapor (represented by solid lines in FIG. 4) through the vapor flow inlet openings. In the embodiment illustrated in FIG. 4, filter 110 is a porous skirt positioned to surround and embrace the exterior wall of the lower portion 14 of valve housing 12. It will be appreciated that filter 110 could be formed and positioned in a variety of other shapes and manners without impairing the operation thereof.

In another embodiment of the invention illustrated in FIG. 5, those elements referenced by numbers identical to those in FIGS. 1-3 perform the same or similar function. In the embodiment of the valve assembly shown in FIG. 5, valve housing 112 includes a lower roll-over safety portion 114 and an upper tank pressure control valve portion 116. The valve housing 112 can be mounted in a fuel sender unit (not shown) or in any other convenient position within the fuel tank.

The components housed in the lower roll-over safety portion 114 function in a manner similar to that shown in FIGS. 1-3. However, in this embodiment the second inclined ramp portion 76 is configured so as to position the upwardly-extending generatrix 78 in relation to the longitudinal axis 50 of the valve housing to define an included angle of about 60°. In other words, the second ramp portion is inclined at an angle of about 30° relative to the horizontal reference plane 28. This incline is about 10° steeper in comparison to the incline illustrated in the embodiment of FIGS. 1-3 so as to delay slightly the actuation of the roll-over valve to meet predetermined performance criteria. It will be understood that the inclined angles of either or both of ramp portions 46, 76 can be varied to change the "effective ramp surface" provided by the novel double ramps 46, 76 of the present invention.

The upper tank pressure control valve portion 116 functions to regulate the pressure within the fuel tank (not shown) thereby advantageously controlling maximum fuel tank pressure.

In particular, the upper portion 116 is formed to include a vapor discharge chamber 124 in fluid communication with the fluid-conducting passageway 26, an outlet passage 126 in fluid communication with the vapor discharge chamber 124, and an inlet passage 128 in fluid communication with the valve chamber 18 formed in the lower portion 114. Importantly, inlet mouth 130 of the inlet passage 128 is positioned about at the highest location within the fuel tank (not shown) to reduce the likelihood of liquid-fuel carryover into the valve assembly during fuel sloshing. Of course, a discriminator filter, similar in function to filter 110 of FIG. 4, could be installed at a suitable location to filter fuel vapor introduced into inlet passage 128.

A pressure-vacuum valve assembly 132 is installed in vapor discharge chamber 124 to regulate pressure in the fuel tank (not shown). The pressure-vacuum valve assembly 132 includes a gasket 134, an umbrella valve 136, a valve carrier 138, and a spring 140. The gasket 134 is positioned on a bottom wall 142 of valve vapor discharge chamber 124 to surround passageway 26. The valve carrier 138 includes a central portion forming four circumferentially-spaced fluid-conducting apertures 146, a peripheral ring flange 148 defining an exterior sidewall 150 positioned in close proximity to an interior wall 152 of the vapor discharge chamber 124 to define an annular passageway therebetween. The umbrella valve 136 is made of a pliable material and includes a stem 154 that is installed in a central aperture formed in the valve carrier 138 and a resilient valve cover 156 that is positioned normally to cover the lower opening of each of the circumferentially-spaced fluid-conducting apertures 146 formed in the valve carrier 138 as shown in FIG. 5. The spring 140 is installed in the vapor discharge chamber 124 between a top wall 158 thereof and a top surface of the valve carrier 138. Thus, the spring 140 provides means for yieldably urging the ring flange 148 into seating engagement with the gasket 134.

In operation, the spring-biased valve carrier 138 functions to vent fuel vapor from the fuel tank and valve assembly only when the pressure exceeds a predetermined threshold level. Pressurized fuel tank vapor can exert a lifting force on the valve carrier 138 to urge the same against the spring 140, thereby lifting ring flange 148 off gasket 138 to open the annular passageway between the valve carrier 138 and the interior chamber wall 152. The fuel vapor is then discharged from the valve housing 112 via outlet 126 and conducted to a treatment site such as a conventional fuel canister (not shown). The mass and configuration of a valve carrier 138, the size of the various fluid-conducting passages, and the spring constant of the spring are selected to define the threshold pressure level. Thus, the pressure-vacuum valve assembly 132 functions to regulate the maximum pressure allowable in the fuel tank (not shown).

The umbrella valve 136 regulates flow of ambient air or the like from the canister into the valve chamber 18 and the fuel tank in response to suction caused by a vacuum in the fuel tank. Sub-atmospheric pressure in the fuel tank will exert a downwardly-directed force to the resilient valve cover 156 to at least partially open the umbrella valve 136 and draw ambient air or the like through outlet passage 126 and valve carrier apertures 146 into the valve chamber 118 via the fluid-conducting passageway 26. A vacuum created in the fuel tank, due to condensation or the like, will act to draw fuel/fuel vapor from the canister back into the tank. This will prevent the pressure in the fuel tank from dropping to zero and hold the tank pressure constant during an overnight vehicle cool-down or short-term vehicle parking.

One notable feature of this embodiment is that fuel vapor is introduced into the valve chamber 18 only from a point above the valve member 32 so that the fuel vapor is shunted generally away from the interior of the ball-receiving cup 40 defined by the valve member 32. Advantageously, this feature causes the vapor path within the valve housing 112 generally to "push down" on the exterior surface of the valve member 32 and thereby substantially prevent fuel vapor from prematurely lifting the valve member 32 toward its vent-closing position within the valve chamber 18 prior to vehicle rollover.

Figure 7:
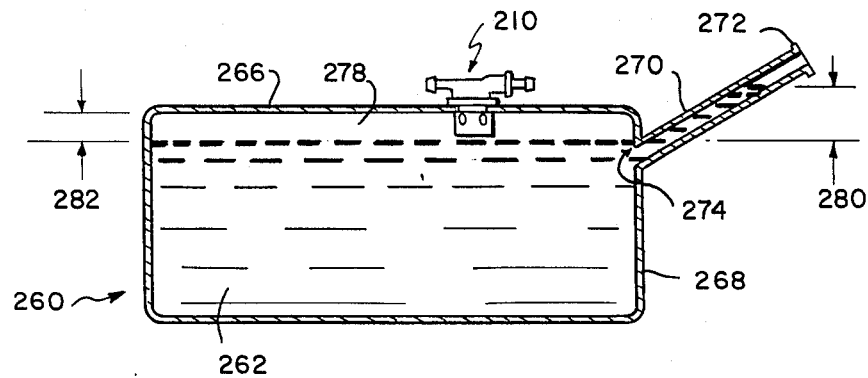
FIG. 7 is a diagrammatic illustration of the valve assembly of FIG. 6 in a working environment.
Figure 6:
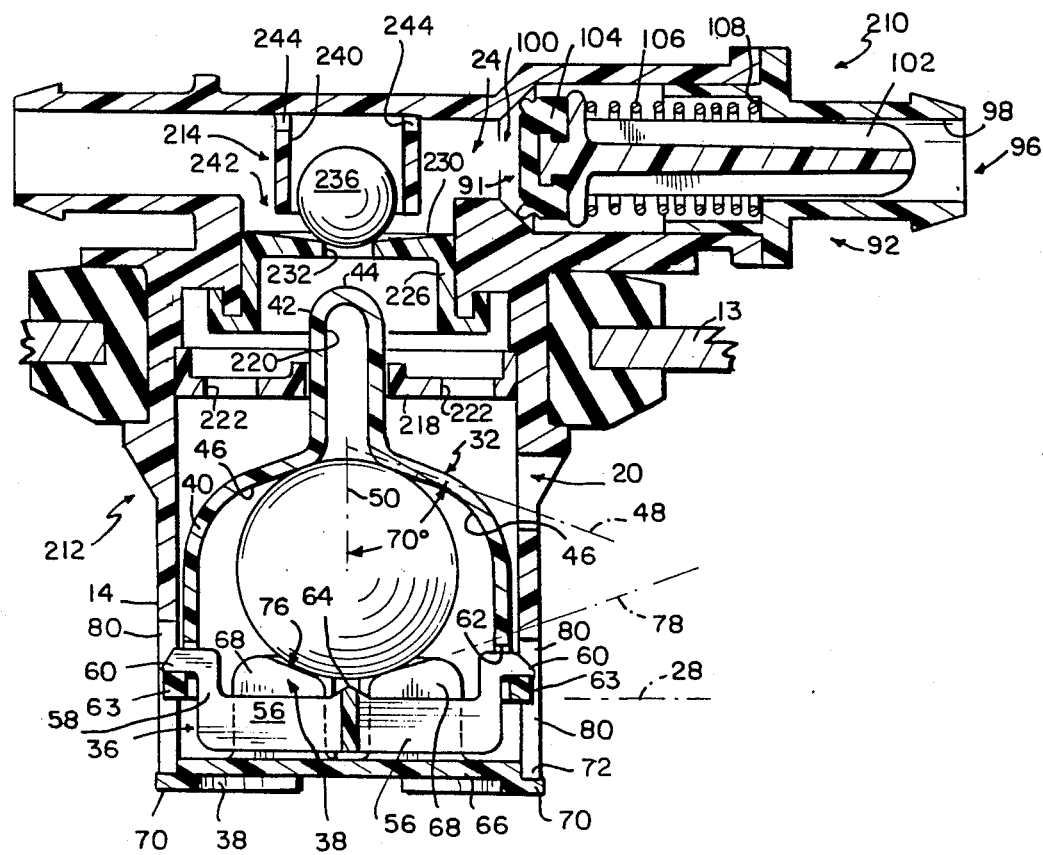
FIG. 6 is a transverse sectional view through yet another embodiment of the present invention.

FIG. 6 shows another embodiment of the invention that is a modification of the embodiment illustrated in FIG. 5. Those elements referenced by numbers identical to those in FIGS. 1–5 perform the same or similar function. In the embodiment of the valve assembly 210 shown in FIG. 6, valve housing 212 includes a pressure valve assembly 214 to control the discharge of pressure from the fuel tank 260 (FIG. 7). The pressure valve assembly 214 functions somewhat differently than the pressure-vacuum valve assembly 132 illustrated in the embodiment of FIG. 5. Specifically, the pressure-vacuum valve assembly 132 in the embodiment illustrated in FIG. 5 is configured to maintain a predetermined pressure within the fuel tank at all times. The valve assembly 132 is configured to vent fuel vapor from the fuel tank only when the pressure in the tank exceeds this predetermined threshold level. The pressure valve assembly 214 illustrated in the embodiment of FIG. 6 is configured to maintain a preselected pressure within the fuel tank only during the fuel tank filling operation. At all other times of vehicle operation, the pressure valve assembly 214 is configured to permit venting of fuel vapor from the fuel tank in a generally unrestricted manner.

The pressure vacuum assembly 214 in the embodiment illustrated in FIG. 6 includes a platform 226 that is disposed above the valve stem 42. The platform 226 includes an upper surface 230 and a centrally disposed orifice 232 formed therethrough. A sealing ball 236 is provided to generally rest upon the upper surface 230 and to seat in the orifice 232 when the valve housing 212 is in a stationary condition. The upper surface 230 of the platform 226 and the size of the orifice 232 cooperate to permit the sealing ball 236 to be relatively easily displaced from the orifice 232 whenever the vehicle (not shown) and valve assembly 210 are disturbed, such as when the vehicle is being driven.

A baffle guide plate 218 is provided below the platform 226 to pilot the valve stem 42 as the valve stem 42 and spherical end 44 move toward the orifice 232 to seal the orifice 232. The movement of the valve stem 42 has been discussed in relation to other embodiments of this invention, and will not be further discussed here. Because the conical valve seat 23 illustrated in FIG. 5 is not included in the embodiment shown in FIG. 6, the baffle guide plate 218 is required to accurately guide the valve stem 42 and spherical end 44 to seal the orifice 232. The baffle guide plate 218 includes a central opening 220 that is sized to receive and laterally retain the valve stem 42. Vent openings 222 are provided in the baffle guide plate 218 to permit venting communication between the fuel tank and the pressure valve assembly 214. Illustratively, four vent openings 222 are provided that are circumferentially spaced around the baffle guide plate 218. The guide plate 218 also aids in preventing fuel from sloshing upwardly through the valve assembly 210 and into the canister (not shown).

A ball guide 240 is provided to retain the ball 236 generally above the orifice 232. As illustrated, the ball guide 240 is a generally cylindrically shaped member that has an inside diameter somewhat greater than the diameter of the ball 236. The greater diameter of the ball guide 240 is provided to permit the ball 236 to move laterally on the upper surface 230 whenever the vehicle is in motion. It will be understood that permitting the ball 236 to move laterally upon the upper surface 230 permits the ball 236 to move away from the orifice 232 to permit fuel vapor to vent through the orifice 232 and outwardly toward the canister (not shown). Thus, this lateral movement, or "rattle" of the ball 236 permits generally unrestricted venting of the fuel tank when the vehicle is in motion. However, when the vehicle is not in motion, the ball 236 provides a preselected, yieldable sealing force to seal the orifice 232 to maintain a preselected pressure within the fuel tank. This preselected pressure within the fuel tank is advantageous during the fuel filling operation of the fuel tank, and will be discussed in greater detail later.

The ball guide 240 is mounted in the valve housing 212 in a manner to create an annular space 242 between the lower end of the ball guide 240 and the upper surface 230 of the platform 226. This annular space 242 provides a venting passageway for the fuel vapor to vent to the canister (not shown). In addition to the space 242, openings 244 are included in the upper portion of the ball guide 240 to provide additional venting passageways for the fuel vapor.

FIG. 7 illustrates one possible use of the valve assembly 210 that is illustrated in FIG. 6. In particular, FIG. 7 shows the valve assembly 210 in place in a fuel tank 260 that may be installed in a vehicle (not shown). The fuel tank 260 is configured to hold a volatile fuel 262 that is capable of producing fuel vapor. The fuel tank 260 includes an upper wall 266 and a sidewall 268. As shown, the valve assembly 210 is fitted into the upper wall 266. It will be understood that the valve assembly 210 will normally be connected to a conventional canister (not shown) to receive the vented fuel vapor. It will be further understood that the valve assembly 210 could be positioned at other locations within the fuel system (not shown) other than that illustrated in FIG. 7. A filler neck 270 is shown extending upwardly and outwardly from the sidewall 268 of the fuel tank 260. The filler neck 270 includes an outer filler end 272 that is configured to receive fuel in any conventional manner. The filler neck 270 further includes an inner end 274 that joins with the sidewall 268 to provide fluid communication between the filler neck 270 and the fuel tank 260.

In operation, the valve assembly 210 functions similar to the embodiments shown in FIGS. 1–5 to permit fuel vapor to be vented from the fuel tank 260 to the canister (not shown). The valve assembly 210 differs from the embodiment illustrated in FIG. 5 in that when the vehicle (not shown) is in motion, the valve assembly 210 permits generally unrestricted venting of fuel vapor from the fuel tank 260. It will be understood that such generally unrestricted venting may be desirable in certain applications, while the embodiment in FIG. 5 may be desirable in other applications. In particular, valve assembly 210 is configured to maintain a preselected pressure, or "pressure head" within the fuel tank 260 only when the vehicle (not shown) is stationary. This preselected pressure head advantageously aids in preventing overfilling of the fuel tank 260 during the fuel filling operation.

Because the fuel 262 is capable of expanding within the fuel tank 260 under certain temperature conditions, and because the fuel 262 is capable of producing fuel vapor, it is desirable to limit the level of the fuel 260 somewhat below the upper wall 266 of the fuel tank 260 in the filling operation to accommodate this expansion of fuel or creation of fuel vapor. This space is illustrated in FIG. 7 as an expansion volume 278. The amount of the expansion volume 278 is generally dictated by the placement of the inner end 274 of the filler neck 270 below the upper wall 266. This distance is designated by the numeral 282 in FIG. 7. When the fuel level within the fuel tank 260 rises above the inner end 274 of the filler neck 270, the fuel being inserted into the filler neck 270 then rises up the filler neck 270 to provide an indication to either the operator or an automatic shut-off on the filling apparatus to shut off the input of fuel. When this procedure is followed, the desirable expansion volume 278 is created in the upper portion of the fuel tank 260.

When the filler neck 270 is full of fuel, the level of the fuel within the filler neck 270 will be normally higher than the level of the fuel within the fuel tank 260. This difference in levels of fuel within the filler neck 270 and the fuel tank 260 is designated by the numeral 280 in FIG. 7. It will be understood that this higher level of fuel in the filler neck 270 creates a pressure, or "pressure head" that is exerted into the fuel tank 260. This pressure head will vary depending upon the distance 280 that the level of fuel in the filler neck 270 exceeds the level of fuel in the fuel tank 260.

If the valve assembly 210 permitted generally unrestricted vapor release during this filling operation, it will be understood that the pressure head created by the fuel in the filler neck 270 could cause the expansion volume 278 to decrease. This could occur because the pressure within the expansion volume 278 would be permitted to vent through the vent assembly 210 which would allow the fuel in the filler neck 270 to flow into the fuel tank 26 to cause the level of fuel to rise in the fuel tank 260. As previously discussed, it is desirable to maintain the preselected amount of expansion volume 278 in the fuel tank 260. To prevent the level of fuel from rising in the fuel tank 260 due to the pressure head created by the fuel in the filler neck 270, it is necessary to maintain a pressure head in the fuel tank 260 to overcome the pressure head created in the filler neck 270.

To provide the pressure head in the fuel tank 260 necessary to maintain the desired amount of expansion volume 278, it is necessary to seal the venting capability of the valve assembly 210 during the filling operation. To provide this sealing, the ball 236 is configured to seat in the orifice 232 when the vehicle is stationary. This permits the ball 236 to seal the orifice 232 to close off the venting capability of the valve assembly 210. The weight of the ball 236 is selected to maintain the proper pressure head within the fuel tank 260 to maintain the desired amount of expansion volume 278. Illustratively, if the filler neck 270 extends 10 inches above the upper wall 266 of the fuel tank 260, then the ball 236 can be selected to maintain a pressure head of 12 inches in the fuel tank 260. This will prevent the pressure head created in the filler neck 270 from reducing the desired amount of expansion volume 278 in the fuel tank 260.

After the filling operation is complete, and the proper expansion volume 278 has been created, it is desirable to permit generally unrestricted venting from the fuel tank 260 through the valve assembly 210. To permit this generally unrestricted venting, the ball 236, ball guide 240, and upper surface 230 of the platform 226 cooperate to permit the ball 236 to rattle within the ball guide 240 to open the orifice 232. By permitting the ball 236 to move away from the orifice 232, the valve assembly 210 then permits fuel vapor to vent from the fuel tank 260 in a generally unrestricted manner. Thus, as long as the vehicle (not shown) is in motion, the ball 236 is generally disabled from sealing the orifice 232. It will be understood that should the vehicle (not shown) remain stationary for a lengthy period of time after filling, the pressure in the fuel tank 260 could increase due to temperature. If the pressure in the fuel tank 260 exceeds the preselected sealing force of the ball 236, the ball 236 will be displaced from the orifice 232 momentarily to permit the pressure to vent through the valve assembly 210.

The embodiment illustrated in FIGS. 6 and 7 permits fuel vapor to vent from the fuel tank 260 whenever the vehicle (not shown) is in motion. In addition, the provision of the ball 236 allows a pressure head to be maintained in the fuel tank 260 during the fuel filling operation to aid in preventing overfilling of the fuel tank 260.

Although the invention has been described in detail with reference to certain preferred embodiments, variations and modifications exist within the scope and spirit of the invention as described and defined in the following claims.

What is claimed is:

1. In a fuel vapor recovery system of a motor vehicle including a fuel tank having a filler neck, a fuel vapor recovery canister and conduit leading from the fuel tank to the canister and a roll-over valve assembly for closing the conduit in response to tilting of the vehicle, the improvement comprising a fuel overfill valve assembly situated in the roll-over valve assembly, the fuel overfill valve comprising a chamber having a first opening to the fuel tank and a second opening to the conduit, a closing means for closing the first opening, the closing means having a mass selected to effect a first closing pressure on the first opening when the vehicle is stationary, the closing means having a size selected relative to the chamber to permit movement therein and thereby effect a second closing pressure less than the first closing pressure when the vehicle is subjected to vibration due to normal operation of the vehicle.

2. The improvement of claim 1, wherein the first closing pressure is selected to produce a predetermined head pressure in the fuel tank during introduction of fuel through the filler neck into the fuel tank during refueling in excess of a maximum head pressure produced in the filler neck upon completely filling the filler neck with fuel, the predeteremined head pressure acting to block the introduction of fuel into the fuel tank in excess of a predeteremined fuel capacity during refueling.

3. A vehicle fuel vapor recovery system for regulating the flow of fuel and fuel vapor through a venting outlet provided in a fuel tank having a separate filler neck, the fuel vapor recovery system comprising
   a fuel vapor recovery canister,
   a conduit leading from the venting outlet to the canister,
   a roll-over valve assembly including first closure means for closing the venting outlet when the vehicle is tilted beyond a predetermined angle, the roll-over valve assembly including second closure means for automatically blocking the discharge of fuel vapor from the fuel tank through the venting outlet as long as the vehicle is substantially stationary and the pressure within the fuel tank remains below a predetermined threshold level, and
   the roll-over valve assembly also including housing means for positioning the second closure means in proximity to the venting outlet so that the second closure means is normally gravitationally urged into a blocking position closing the venting outlet to permit pressure within the fuel tank to rise to at least said predetermined threshold level as fuel is introduced into the fuel tank during refueling and also to provide a pressurized fuel vapor barrier within the fuel tank that acts to displace fuel in the fuel tank, thereby aiding in preventing overfilling of the fuel tank during refueling, the housing means being configured to provide a space for receiving the second closure means and sized to permit movement of the second closure means within the space away from its blocking position in response to vibrations induced during normal vehicle transit so that fuel vapor having a pressure less than the predetermined threshold level is exhaustible from the fuel tank through the venting outlet.

4. The vapor recovery system of claim 3, wherein said second closure means comprises a ball disposed within said housing means and above said venting outlet.

5. A fuel vapor control valve for use with a vehicle fuel system including a fuel tank having a filler neck and a separate venting outlet, the fuel vapor control valve comprising
- a hollow valve housing having an inlet communicating with the venting outlet for admitting fuel vapor from the fuel tank into the valve housing and outlet means for discharging fuel vapor from the valve housing, the valve housing including a top wall and a shroud appended to the top wall to extend into the hollow valve housing and
- a valve member positioned within the shroud above the venting outlet for movement between an outlet-closing position and outlet-opening positions, the valve member having a predetermined weight sufficient to move the valve member downwardly to its outlet-closing position so long as the vehicle remains substantially stationary during refueling of the fuel tank, the predetermined weight being selected to retain the valve member in its outlet-closing position as long as the head pressure developed in the fuel tank remains below a predetermined threshold level so that the head pressure developed in the fuel tank exceeds a maximum pressure head in the filler neck resulting from filling the filler neck with the fuel during refueling, the hollow valve housing being configured to permit movement of the valve member therein away from its outlet-closing position in response to vibrations induced during normal vehicle transit so that fuel vapor at a pressure below the predetermined threshold level is exhausted through the venting outlet while the vehicle is moving.

6. The control valve of claim 5, wherein the valve member is a ball freely disposed in the valve housing.

7. A roll-over valve for use in a vehicle fuel system, the roll-over valve comprising
- an upper portion and a lower portion, the lower portion including a side wall and an upper end wall which define a downwardly-opening chamber, the upper end wall including a venting orifice,
- a venting conduit disposed above said upper end wall, the conduit formed to include a retaining shroud,
- a first valve member axially movable in the chamber, the first valve member having a closing piece engageable with the venting orifice for closing the venting orifice when the valve member moves upwardly in the chamber, and a cup having a downwardly-facing and inclined top ramp portion and an axially-extending wall portion,
- a retainer engageable with the lower portion for retaining the valve member in the chamber, the retainer including an upwardly-facing and inclined bottom ramp portion, and
- a ball disposed between the cup and the retainer, the ball being cooperable with the top ramp portion of the cup and the bottom ramp portion of the retainer for translating radial movement of the ball into axially upward movement of the valve member to move the closing piece into and out of engagement with the venting orifice, and
- a second valve member disposed for movement in the retaining shroud, the second valve member configured to close the venting orifice independent of the action of the first valve member when the vehicle is stationary and to open the venting orifice when the vehicle is subjected to vibration.

* * * * *